United States Patent
Eo et al.

(10) Patent No.: US 10,041,423 B2
(45) Date of Patent: Aug. 7, 2018

(54) NON-UNIFORM DISPLACEMENT ENGINE CONTROL SYSTEM WITH DIFFERENT CONTROL MODES BASED ON STATE OF CHARGE OF BATTERY AND METHOD FOR CONTROLLING NON-UNIFORM DISPLACEMENT ENGINE WITH DIFFERENT CONTROL MODES BASED ON STATE OF CHARGE OF BATTERY

(71) Applicant: HYUNDAI MOTOR COMPANY, Seoul (KR)

(72) Inventors: Jeong Soo Eo, Hwaseong-si (KR); Yeon Bok Kim, Seongnam-si (KR); Youn Kwang Jung, Suwon-si (KR); Sung Jae Kim, Suwon-si (KR); Young Joon Chang, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/266,680

(22) Filed: Sep. 15, 2016

(65) Prior Publication Data

US 2017/0082046 A1  Mar. 23, 2017

(30) Foreign Application Priority Data

Sep. 17, 2015 (KR) .................. 10-2015-0131356
Apr. 8, 2016 (KR) .................. 10-2016-0043475

(51) Int. Cl.
*F02N 11/04* (2006.01)
*B60W 20/10* (2016.01)
(Continued)

(52) U.S. Cl.
CPC ............ *F02D 41/0085* (2013.01); *B60K 6/24* (2013.01); *B60K 6/48* (2013.01); *B60W 10/06* (2013.01);
(Continued)

(58) Field of Classification Search
CPC .... F02D 41/0085; F02N 11/04; B60W 20/10; F02B 75/40
(Continued)

(56) References Cited

U.S. PATENT DOCUMENTS 4,411,230 A * 10/1983 Lee .................. F02D 41/0087
                                                123/198 F
5,374,224 A   12/1994 Huffmaster et al.
(Continued)

FOREIGN PATENT DOCUMENTS

JP    07-208222 A    8/1995
JP    07-229754 A    8/1995
(Continued)

OTHER PUBLICATIONS

Non-Final Office Action dated Jan. 17, 2017, issued in U.S. Appl. No. 14/954,450.
(Continued)

*Primary Examiner* — Mahmoud Gimie
(74) *Attorney, Agent, or Firm* — McDermott Will & Emery LLP

(57) ABSTRACT

A non-uniform displacement engine control system with different control modes based on a state of charge (SOC) of a battery, the system includes a non-uniform displacement engine including a plurality of cylinders, the cylinders comprising at least two sizes of cylinders having different displacements, a motor connected to a driving shaft of the engine, a battery for supplying electrical energy to the motor, and a motor control device for controlling the motor, wherein the motor control device controls the motor to compensate for a difference in torque due to different displacements of the cylinders such that a sum of engine torque and motor torque in explosion stroke of each cylinder is uniform, and the motor control device has a charge (Continued)

intention mode or a discharge intention mode based on the SOC of the battery.

18 Claims, 7 Drawing Sheets

(51) Int. Cl.
| | |
|---|---|
| *F02D 41/00* | (2006.01) |
| *F02B 75/40* | (2006.01) |
| *B60K 6/24* | (2007.10) |
| *B60K 6/48* | (2007.10) |
| *B60W 10/06* | (2006.01) |
| *B60W 10/08* | (2006.01) |
| *B60W 30/20* | (2006.01) |
| *B60W 20/15* | (2016.01) |
| *B60W 20/13* | (2016.01) |

(52) U.S. Cl.
CPC ............ *B60W 10/08* (2013.01); *B60W 20/10* (2013.01); *B60W 20/13* (2016.01); *B60W 20/15* (2016.01); *B60W 30/20* (2013.01); *F02B 75/40* (2013.01); *F02N 11/04* (2013.01); *B60K 2006/4825* (2013.01); *B60W 2030/206* (2013.01); *B60W 2510/0685* (2013.01); *B60W 2510/244* (2013.01); *B60W 2710/083* (2013.01); *F02D 2200/503* (2013.01); *F02D 2250/18* (2013.01); *F02D 2250/28* (2013.01); *F02N 2200/061* (2013.01)

(58) Field of Classification Search
USPC ........................................ 701/111; 123/48 R
See application file for complete search history.

(56) References Cited

U.S. PATENT DOCUMENTS

| | | | |
|---|---|---|---|
| 5,437,253 | A | 8/1995 | Huffmaster et al. |
| 5,722,359 | A | 3/1998 | Chubachi et al. |
| 7,240,749 | B2 | 7/2007 | Bhavsar et al. |
| 9,440,640 | B1 | 9/2016 | Pritchard et al. |
| 2002/0116099 | A1 | 8/2002 | Tabata et al. |
| 2004/0012206 | A1 | 1/2004 | Wakashiro et al. |
| 2005/0011690 | A1 | 1/2005 | Bhavsar et al. |
| 2005/0164826 | A1 | 7/2005 | Albertson |
| 2006/0032684 | A1 | 2/2006 | Rayl |
| 2006/0196463 | A1 | 9/2006 | Pallett et al. |
| 2007/0078586 | A1* | 4/2007 | Pallett ................... B60K 6/445 701/101 |
| 2007/0131183 | A1 | 6/2007 | Shei |
| 2009/0259380 | A1 | 10/2009 | Picron et al. |
| 2010/0042279 | A1 | 2/2010 | Thompson et al. |
| 2011/0115439 | A1 | 5/2011 | Kim |
| 2013/0096759 | A1 | 4/2013 | Breton et al. |
| 2013/0255639 | A1 | 10/2013 | Guillen Castillo et al. |
| 2013/0276755 | A1 | 10/2013 | Springer et al. |
| 2015/0203105 | A1* | 7/2015 | Liang ..................... B60L 15/20 701/22 |
| 2015/0314773 | A1* | 11/2015 | Zhou .................... B60W 10/06 701/22 |

FOREIGN PATENT DOCUMENTS

| | | |
|---|---|---|
| JP | 08-312393 A | 11/1996 |
| JP | 2002-013423 A | 1/2002 |
| JP | 2002276416 A | 9/2002 |
| JP | 2004-052573 A | 2/2004 |
| JP | 2004108342 A | 4/2004 |
| JP | 2007-069860 A | 3/2007 |
| JP | 2007-162672 A | 6/2007 |
| JP | 2010-247830 A | 11/2010 |
| JP | 2011-051383 A | 3/2011 |
| JP | 2015-101959 A | 6/2015 |
| KR | 1997-0044043 A | 7/1997 |
| KR | 10-2006-0069095 A | 6/2006 |
| KR | 10-2011-0054135 A | 5/2011 |
| KR | 10-1091664 B1 | 12/2011 |
| KR | 10-2013-0106482 A | 9/2013 |
| KR | 10-2014-0059680 A | 5/2014 |

OTHER PUBLICATIONS

Extended European Search Report dated Jan. 26, 2017, issued in European Application No. 15197480.5.
U.S. Final Office Action issued in U.S. Appl. No. 14/954,456, dated Jul. 3, 2017.
Non-Final Office Action issued in corresponding U.S. Appl. No. 14/954,450, dated Jan. 11, 2018.
Non-Final Office Action issued in related U.S. Appl. No. 15/266,622, dated Feb. 9, 2018.
Non-Final Office Action issued in U.S. Appl. No. 15/264,998, dated Mar. 21, 2018.
Non-Final Office Action issued in U.S. Appl. No. 15/264,812, dated Apr. 2, 2018.

* cited by examiner

NON-UNIFORM DISPLACEMENT ENGINE CONTROL SYSTEM WITH DIFFERENT CONTROL MODES BASED ON STATE OF CHARGE OF BATTERY AND METHOD FOR CONTROLLING NON-UNIFORM DISPLACEMENT ENGINE WITH DIFFERENT CONTROL MODES BASED ON STATE OF CHARGE OF BATTERY

CROSS-REFERENCE TO RELATED APPLICATION

This application claims under 35 U.S.C. § 119(a) the benefit of priority to Korean Patent Application Nos. 10-2015-0131356 and 10-2016-0043475, filed on Sep. 17, 2015 and Apr. 8, 2016 with the Korean Intellectual Property Office, respectively, the entire contents of which are incorporated herein by reference.

TECHNICAL FIELD

The present disclosure relates to a non-uniform displacement engine control system with different control modes based on a state of charge (SOC) of a battery and a method for controlling a non-uniform displacement engine with different control modes based on a state of charge (SOC) of a battery. More particularly, the present disclosure relates to a system and method for controlling an engine and a motor based on a SOC of a battery in a vehicle having an engine including cylinders having different displacements and a motor for supplementing the driving force of the engine.

BACKGROUND

A conventional internal combustion engine is configured such that cylinders have uniform displacements in order to satisfy the distribution characteristics of intake and exhaust systems. The uniform displacement engine has an advantage in that it is possible to easily control an air-to-fuel ratio and exhaust gas. However, the uniform displacement engine has a disadvantage in that a margin for operation point control is insufficient due to the fixed displacement thereof. As a result, it is difficult to satisfy both operational efficiency and fuel efficiency in a specific operation zone, and therefore problems must be addressed by compromising one or both of operational efficiency and fuel efficiency.

In addition, in the engine having fixed displacement cylinders, excessive mechanical energy is consumed in order to secure stable idling, which is inefficient. In particular, operation point control is inevitably and frequently inefficient due to limitations caused by vibration and noise.

Such problems, which may occur over the entire operation zone of the conventional internal combustion engine, are solved by striking a tradeoff between operational efficiency, fuel efficiency and exhaust properties.

Meanwhile, Japanese Patent Laid Open Publication No. 2007-162672 discloses a cylinder arrangement structure of a multi-stage type displacement adjustable engine in which cylinders having different displacements are arranged such that the displacement of the engine is adjusted in multiple stages based on operational combinations of the cylinders.

The cylinder arrangement structure of the multi-stage type displacement adjustable engine disclosed in Japanese Patent Laid Open Publication No. 2007-162672 has effects in that the displacement of the engine is adjusted in multiple stages, and therefore it is possible to control the operation of the engine in respective operation zones, thereby simultaneously improving operational efficiency and fuel efficiency. However, problems may arise in that vibration and noise are generated due to the imbalance in displacement among the cylinders, making it difficult to apply the cylinder arrangement structure of the multi-stage type displacement adjustable engine to vehicles that are mass-produced.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art, and it is an object of the present disclosure to provide a non-uniform displacement engine control system that is capable of reducing vibration and noise generated by a non-uniform displacement engine including cylinders having different displacements and securing various levels of power performance based on driving conditions through the cooperation of the engine and a motor, particularly a non-uniform displacement engine control system configured to selectively use a charge intention mode or a discharge intention mode based on a state of charge (SOC) of a battery, and a method for the same.

In one aspect, the present disclosure provides a non-uniform displacement engine control system with different control modes based on a state of charge (SOC) of a battery, the system including a non-uniform displacement engine including a plurality of cylinders, the cylinders including at least two kinds of cylinders having different displacements, a motor connected to a driving shaft of the engine, a battery for supplying electrical energy to a motor, and a motor control device for controlling the motor, wherein the motor control device controls the motor to compensate for a difference in torque due to different displacements of the cylinders such that a sum of engine torque and motor torque in explosion stroke of each cylinder is uniform, and the motor control device has a charge intention mode or a discharge intention mode based on the SOC of the battery.

In an embodiment, the motor control device may perform control to reduce a discharge amount due to driving of the motor based on the SOC of the battery in the charge intention mode and to reduce a charge amount due to energy regeneration in the discharge intention mode.

In another embodiment, the charge intention mode or the discharge intention mode may be temporarily applied until the SOC of the battery reaches a predetermined reference value.

In still another embodiment, the motor control device may apply a compensation coefficient ($\alpha<1$) for motor driving torque in the charge intention mode and a compensation coefficient ($\beta<1$) for regenerative torque in the discharge intention mode.

In yet another embodiment, the compensation coefficients may be fixed values or values preset so as to vary based on the SOC of the battery.

In still yet another embodiment, the motor control device may control the motor based on the discharge intention mode when the SOC of the battery is equal to or greater than a predetermined upper limit value and may control the motor based on the charge intention mode when the SOC of the battery is equal to or less than a predetermined lower limit value.

In a further embodiment, the motor control device may perform control to terminate the discharge intention mode when the SOC of the battery reaches a predetermined reference value in the discharge intention mode and to terminate the charge intention mode when the SOC of the battery reaches the predetermined reference value in the charge intention mode, and may control the motor such that the sum of the engine torque and the motor torque is uniform when the discharge intention mode or the charge intention mode is terminated.

In another further embodiment, the non-uniform displacement engine may include two sets of cylinders, each set of cylinders including two cylinders having the same displacement.

In still another further embodiment, the non-uniform displacement engine may be configured such that first and fourth cylinders have higher displacement than second and third cylinders, and each set of cylinders may alternately perform an explosion stroke.

In yet another further embodiment, the non-uniform displacement engine may include two kinds of cylinders having different displacements, and the motor control device may include a mode for controlling the motor such that energy regeneration is achieved in explosion strokes of high displacement cylinders and controlling the motor such that power assistance is achieved by the motor torque in explosion strokes of low displacement cylinders such that the sum of the engine torque and the motor torque in the explosion stroke of each cylinder is uniform.

In another aspect, the present disclosure provides a control method of a system including a non-uniform displacement engine including a plurality of cylinders, the cylinders including at least two kinds of cylinders having different displacements, and a motor connected to a driving shaft of the engine, the method including (a) driving the non-uniform displacement engine, (b) determining motor torque based on engine torque, and (c) controlling the motor based on the determined motor torque, wherein step (b) includes compensating for a difference in torque due to the cylinders having different displacements to control the motor such that a sum of the engine torque and the motor torque in explosion stroke of each cylinder is uniform, and having a charge intention mode or a discharge intention mode based on an SOC of a battery.

In an embodiment, control may be performed to reduce a discharge amount due to driving of the motor based on the SOC of the battery in the charge intention mode and to reduce a charge amount due to energy regeneration in the discharge intention mode.

In another embodiment, the charge intention mode or the discharge intention mode may be temporarily applied until the SOC of the battery reaches a predetermined reference value.

In still another embodiment, a compensation coefficient ($\alpha<1$) for motor driving torque may be applied in the charge intention mode, and a compensation coefficient ($\beta<1$) for regenerative torque may be applied in the discharge intention mode.

In yet another embodiment, the compensation coefficients may be fixed values or values preset so as to vary based on the SOC of the battery.

In still yet another embodiment, step (b) may include controlling the motor based on the discharge intention mode when the SOC of the battery is equal to or greater than a predetermined upper limit value and controlling the motor based on the charge intention mode when the SOC of the battery is equal to or less than a predetermined lower limit value.

In a further embodiment, control may be performed to terminate the discharge intention mode when the SOC of the battery reaches a predetermined reference value in the discharge intention mode and to terminate the charge intention mode when the SOC of the battery reaches the predetermined reference value in the charge intention mode, and the motor may be controlled such that the sum of the engine torque and the motor torque is uniform when the discharge intention mode or the charge intention mode is terminated.

In another further embodiment, the non-uniform displacement engine may include two kinds of cylinders having different displacements, and step (b) may include a mode for controlling the motor such that energy regeneration is achieved in explosion strokes of high displacement cylinders and controlling the motor such that power assistance is achieved by the motor torque in explosion strokes of low displacement cylinders such that the sum of the engine torque and the motor torque in the explosion stroke of each cylinder is uniform.

Other aspects and embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
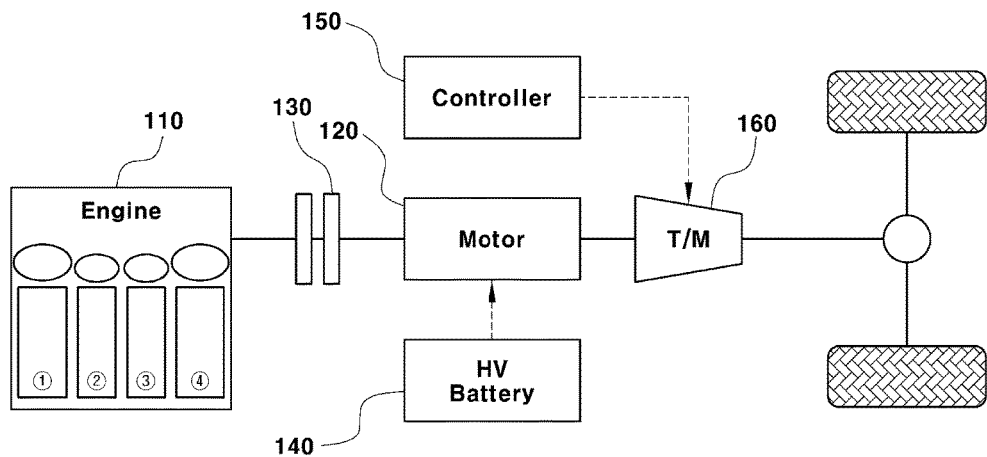
FIG. 1 is a view schematically showing a construction of a non-uniform displacement engine control system according to embodiments of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments which may be included within the spirit and scope of the disclosure as defined by the appended claims.

The present disclosure provides a new-concept non-uniform displacement engine control system that performs control using a motor in a system including a non-uniform displacement engine including cylinders having different displacements, thereby achieving different displacements based on driving conditions, and a method for the same. In particular, the present disclosure has another characteristic in that a system depending upon the conventional inefficient use of mechanical energy is configured to utilize electrical energy, which is more efficient, thereby improving overall system efficiency.

In addition, the present disclosure has another characteristic in that a charge intention mode or a discharge intention mode is selectively used based on a state of charge (SOC) of a battery, whereby it is possible to maintain the state of charge of the battery to be uniform by variably controlling the charge amount or the discharge amount based on the current state of the battery.

The present disclosure is configured such that high displacement cylinders and low displacement cylinders are arranged to execute a high displacement mode and a low displacement mode based on driving conditions, thereby improving fuel efficiency and power performance utilizing the increase in potential energy and kinetic energy of high displacement. In addition, the proportion of a vibration/noise generation area that can be controlled by the motor is increased, thereby improving avoidance to a more advantageous driving point.

In an embodiment of the present disclosure, the non-uniform displacement engine has a four cylinder structure including two cylinders of one kind, or size, having the same displacement and two cylinders of another kind, or size, having the same displacement. However, the present disclosure is not limited thereto, and it should be noted that extensions and modifications are possible so long as the technical concepts of the present disclosure are not changed.

Hereinafter, a motor-assisted non-uniform displacement engine control system according to an embodiment of the present disclosure and a method for the same will be described in detail with reference to the accompanying drawings.

FIG. 1 is a view schematically showing a construction of a motor-assisted non-uniform displacement engine control system according to embodiments of the present disclosure.

As shown in FIG. 1, the system may include an engine (110) and a motor (120) as driving sources that provide driving torque necessary to drive a vehicle.

Driving shafts of the engine (110) and the motor (120) are connected to each other via a power switching device (130), such as a clutch. However, the present disclosure is not limited thereto. The driving shafts of the engine (110) and the motor (120) may be directly connected to each other. In addition, the system may include a battery (140) for supplying electrical energy to the motor (120) and a motor control device (150) for controlling the operation of the motor (120). In the present disclosure, the battery is used as an electrical energy supply means. However, the present disclosure is not limited thereto as long as the electrical energy supply means can supply electrical energy necessary to drive the motor (120) while storing the electrical energy.

In addition, although not shown, the system may include an engine control device for controlling the engine (110). The engine control device and the motor control device may be controlled by a higher-level controller. Alternatively, the engine control device and the motor control device may be integrated into a single controller.

In addition, driving torque from the engine (110) and the motor (120) may be transmitted to driving wheels via a transmission (160).

Meanwhile, as shown in FIG. 1, the control system of the present disclosure includes a non-uniform displacement engine including a plurality of at least two kinds, or sizes, of cylinders having different displacements.

The non-uniform displacement engine is characterized by different displacements for respective cylinders, and selects the merits and demerits of high displacement and low displacement based on a controllable strategy in order to improve fuel efficiency and power performance. In addition, according to the present disclosure, which is configured as a system assisted by a motor, it is possible to compensate for the characteristics of each cylinder utilizing the motor. Moreover, it is possible to improve driving efficiency and to optimize energy efficiency through energy recovery. In particular, unlike the related art in which excessive mechanical energy is used in order to secure stable idling, it is possible to secure stable idling utilizing the electrical energy of the motor. In addition, it is possible to mitigate vibration and noise utilizing the motor.

For example, as shown in FIG. 1, the non-uniform displacement engine may have a four cylinder structure including two cylinders of one kind, or size, having the same displacement and two cylinders of another kind, or size, having the same displacement.

Non-uniform displacement may be set based on the characteristics of the system. The cylinders may be symmetrically arranged in ignition (explosion) order such that a vibration component caused by the difference in displacement can be offset.

That is, in explosion order 1-3-4-2 or 1-2-4-3, cylinders located at corresponding positions, i.e. the first and fourth cylinders and the second and third cylinders may have the same displacement, and other cylinder groups may have different displacements.

For example, the first and fourth cylinders may have a relatively high displacement, and the second and third cylinders may have a relatively low displacement as compared to the first and fourth cylinders. This case is shown in FIG. 1.

According to this cylinder arrangement, it is possible to offset a vibration component based on the arrangement of the cylinders at corresponding positions, thereby improving vibration and noise characteristics.

In a case in which the engine is configured as a four-cylinder engine having a total displacement of 1.5 L according to a first embodiment, as an example of the present disclosure, the first and fourth cylinders may have a displacement of 0.4 L for each of the two cylinders, which may be a high displacement, and the second and third cylinders may have a displacement of 0.35 L for each of the two cylinders, which may be a low displacement.

According to the first embodiment, the four-cylinder engine may be ignited in order 1-3-4-2, and cylinders having different displacements may be arranged so as to correspond to the opposite cylinders in the ignition order, in order to offset a vibration component which may be caused due to non-uniform displacement.

Figure 2:
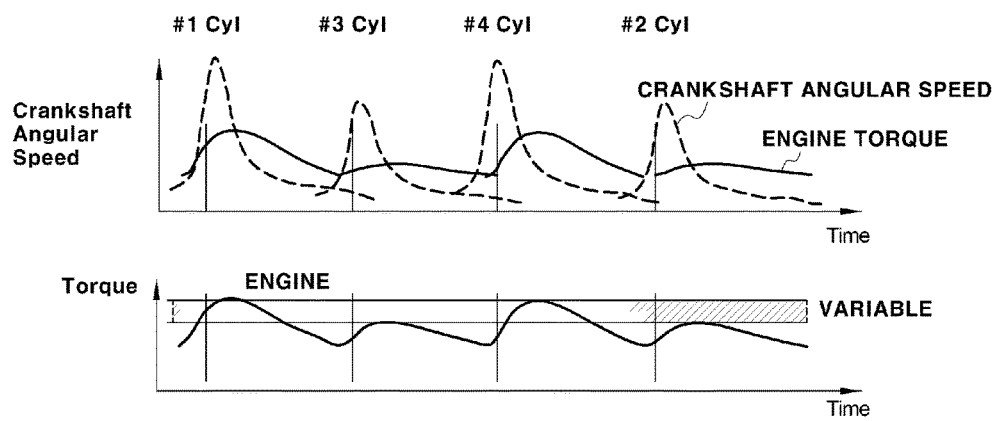
FIG. 2 is a graph showing dynamic characteristics of a non-uniform displacement engine according to embodiments of the present disclosure.

Meanwhile, FIG. 2 is a graph showing dynamic characteristics of a non-uniform displacement engine according to the first embodiment.

As shown in FIG. 2, the first and fourth cylinders, which are high displacement cylinders, have higher torque and crankshaft angular speed, which are generated as a result of explosions, than do the second and third cylinders. That is, referring to the crankshaft angular speed and the engine torque of explosion strokes of each cylinder, the high displacement cylinders have higher crankshaft angular speeds and engine torques than do the lower displacement cylinders.

The explosion stroke of each cylinder means a period set based on the same criterion, such as crank angles before and after the explosion of each cylinder or the distance from a top dead center (TDC) to the upper end of a piston that is set.

The difference in displacement among the cylinders causes non-uniform driving of the engine, resulting in vibration and noise.

Meanwhile, an embodiment of the present disclosure includes motor control for compensating for non-uniform engine driving characteristics.

Figure 3:
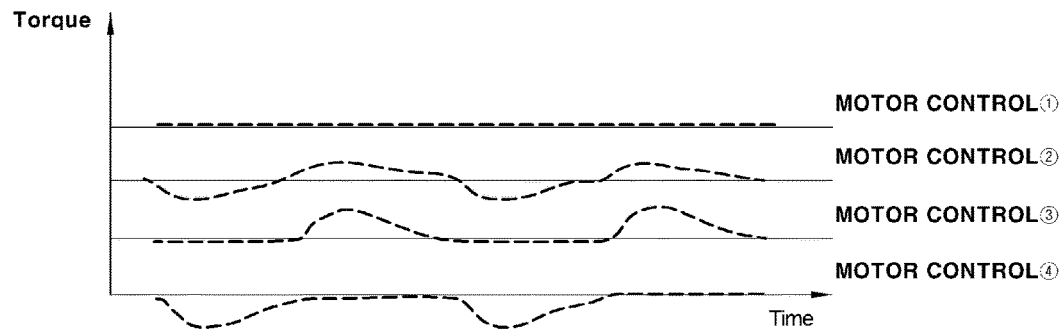
FIG. 3 is a view showing motor torque control that assists torque output from a non-uniform displacement engine according to embodiments of the present disclosure.

FIG. 3 shows examples of such motor control. Specifically, FIG. 3 shows examples of motor torque control assisting torque output from a non-uniform displacement engine. In addition, FIGS. 4A to 4D respectively show motor control methods according to motor control modes ① to ④ shown in FIG. 3.

FIG. 3 shows motor control modes ① to ④. In motor control mode ①, the motor is not driven, or the motor is controlled to generate uniform driving torque. In motor control modes ② to ④, the motor is controlled differently in respective explosion strokes of the non-uniform displacement engine.

Figure 4A:
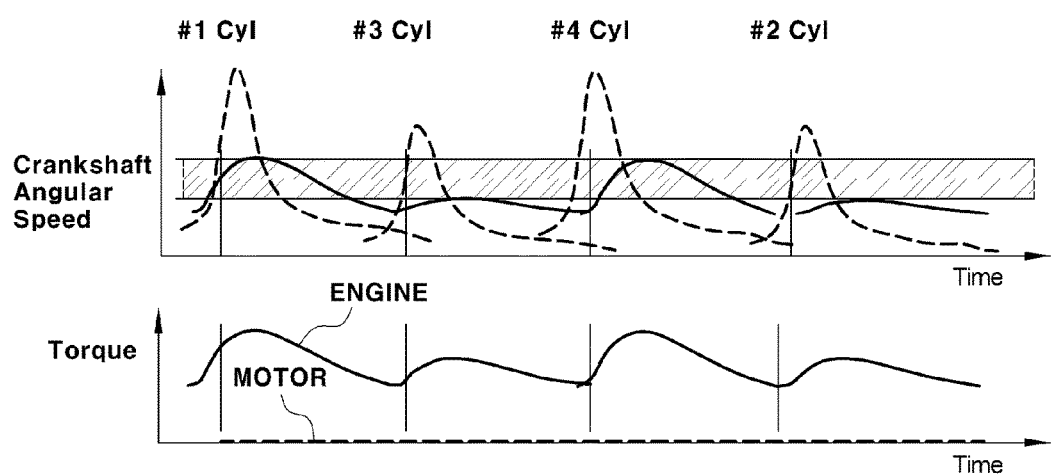
FIGS. 4A to 4D are views showing a control method of a motor-assisted non-uniform displacement engine control system according to embodiments of the present disclosure.

Particularly, in motor control mode ①, as shown in FIG. 4A, the motor is not driven, or the motor is controlled to generate uniform driving torque. Since pulsation components of the high displacement cylinders and the lower displacement cylinders are utilized, unique driving characteristics of the non-uniform displacement engine remain unchanged (the crankshaft angular speed is not changed).

Consequently, it is possible to improve driving efficiency and fuel efficiency at a high efficiency point utilizing increment in kinetic energy of the high displacement cylinders and to improve responsiveness in a transition state and power performance utilizing the increase in potential energy.

Meanwhile, in motor control modes ② to ④, the motor is controlled differently in respective explosion strokes of the non-uniform displacement engine. In motor control mode ②, power assistance and energy regeneration are proportionally controlled in order to minimize a vibration component. Motor control mode ③ is used for traveling at the maximum power, and motor control mode ④ is used for traveling at the minimum power.

That is, in motor control modes ② to ④, the motor is selectively controlled by the motor control device. Motor control may be performed in order to compensate for the difference in torque due to the different displacements of the cylinders. In the explosion stroke of each cylinder, therefore, the motor may be controlled such that the sum of the engine torque and the motor torque is uniform using driving or energy regeneration of the motor. Motor control modes ② to ④ are respectively shown in FIGS. 4B to 4D. In each torque graph, the solid line indicates engine torque, and the dotted line indicates motor torque. In addition, it can be seen from a comparison with FIG. 4A that it is possible to obtain uniform crankshaft angular speed through power assistance or energy regeneration by the motor.

Figure 4B:
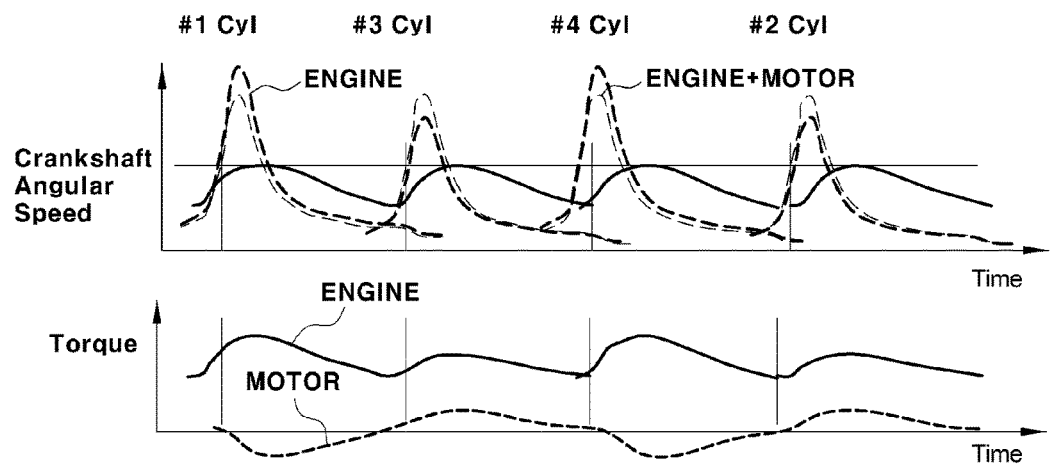

Specifically, in motor control mode ②, a target displacement is set, and driving torque of the engine and the motor is set based on the target displacement, such that the motor has uniform output characteristics in all explosion strokes. As shown in FIG. 4B, the motor is controlled such that negative torque is generated through energy regeneration of the motor in the explosion strokes of the high displacement cylinders, and the motor is controlled such that positive torque is generated by the motor to achieve power assistance in the explosion strokes of the low displacement cylinders. The motor is controlled to have uniform output characteristics in the respective explosion strokes, whereby it is possible to minimize a vibration component of the non-uniform displacement engine.

Figure 4C:
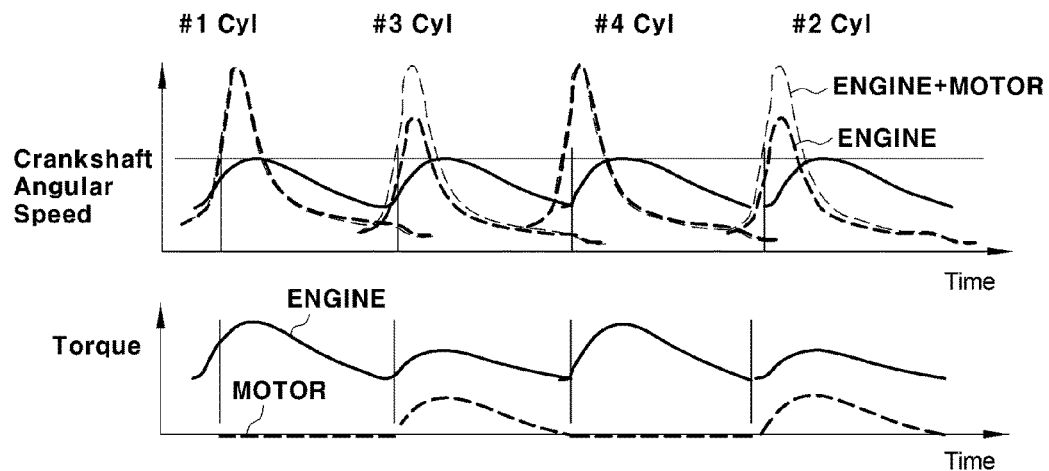

Motor control mode ③ is used for traveling at the maximum power of the non-uniform displacement engine. The motor is controlled such that the low displacement cylinders are assisted by the motor to achieve the maximum power of the given non-uniform displacement. In motor control mode ③, the motor may be controlled such that the same power performance as in the explosion strokes of the high displacement cylinders is achieved in the explosion strokes of the low displacement cylinders through power assistance by the motor. As shown in FIG. 4C, therefore, the motor is controlled such that power assistance by the motor is not achieved in the explosion strokes of the high displacement cylinders and such that traveling is performed at the maximum power as in the explosion strokes of the high displacement cylinders through power assistance by the motor only in the explosion strokes of the low displacement cylinders.

Figure 4D:
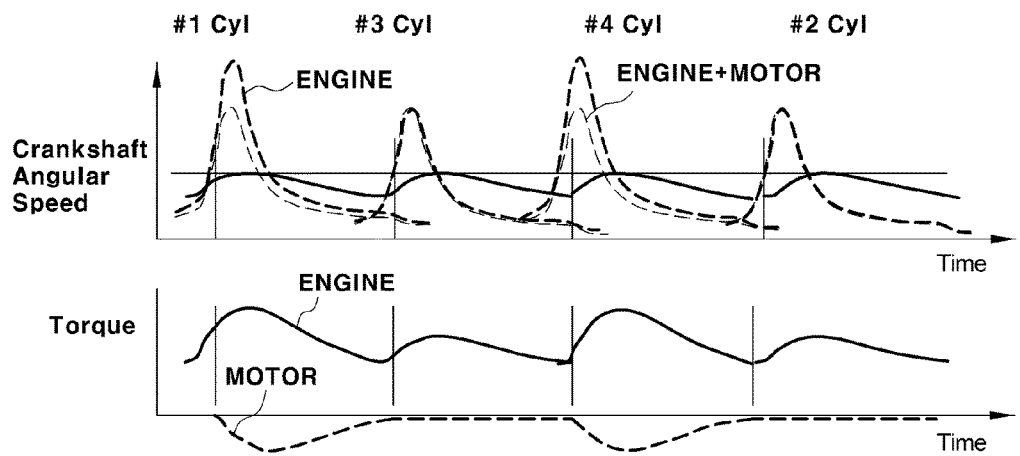

Meanwhile, motor control mode ④ is used for traveling at the minimum power of the non-uniform displacement engine. The motor is controlled such that the excessive energy from the high displacement cylinders is recovered by the motor to achieve the minimum power of the given non-uniform displacement. In motor control mode ④, as shown in FIG. 4D, the motor is controlled such that power assistance by the motor is not achieved in the explosion strokes of the low displacement cylinders and such that negative torque is generated by energy regeneration in the explosion strokes of the high displacement cylinders, reversely to motor control mode a. Particularly, in motor control mode ④, the motor is controlled based on the minimum power of the low displacement cylinders. Consequently, the motor is operated at uniform minimum power based on the low displacement cylinders.

Motor control modes ① to ④ may be selectively used by the motor control device. For example, the motor control device may store motor control modes ② to ④, which are different from one another, and may select any one thereamong to control the motor.

In an embodiment of the present disclosure, it is possible to variably configure substantial driving characteristics of the vehicle according to the utilization of the motor based on the high displacement and the low displacement of the non-uniform displacement engine. In particular, it is possible to elaborately perform variable displacement control within a set range of displacement through the use of the motor control modes.

Figure 5A:
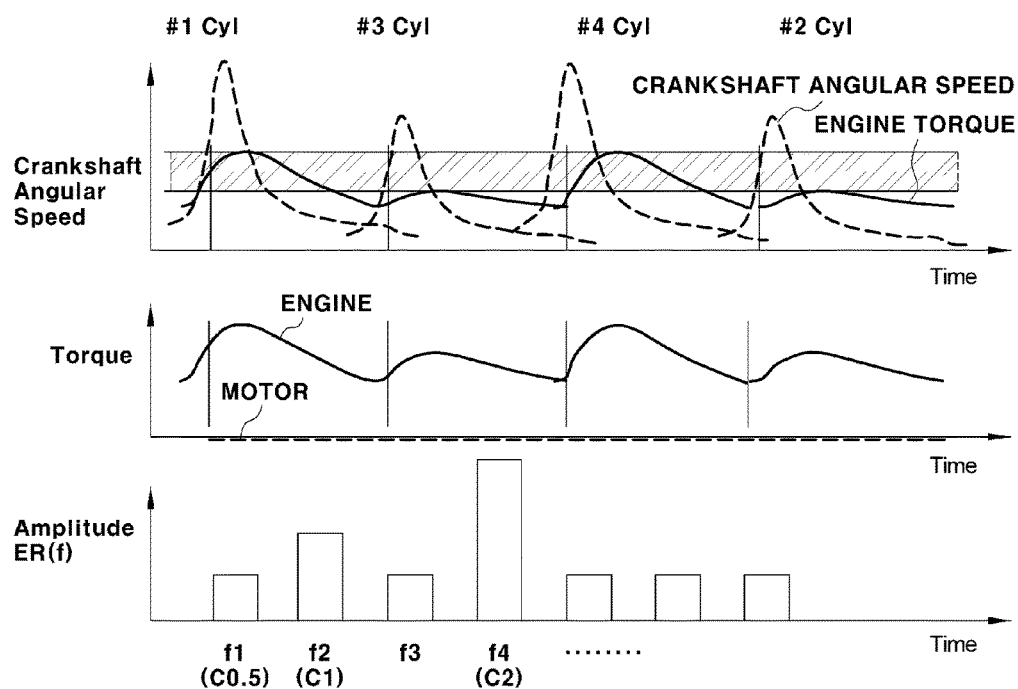
FIGS. 5A and 5B are graphs respectively showing normal control and compensation control modes of a non-uniform displacement engine control system in a frequency domain according to embodiments of the present disclosure.
Figure 5B:
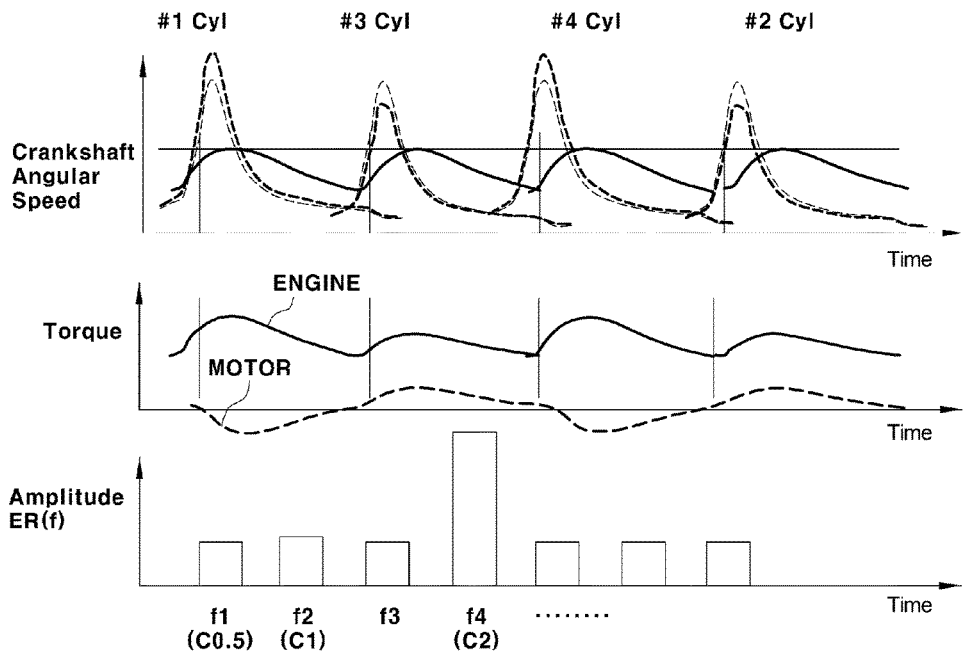

FIGS. 5A and 5B are graphs respectively showing normal control and compensation control modes of a non-uniform displacement engine control system in a frequency domain, particularly showing improvement in the vibration characteristics. That is, in an example of FIG. 5A, a C1 component of the frequency domain is large, and, in an example of FIG. 5B, the C1 component of the frequency domain is greatly reduced through the use of control modes ② to ④, thereby greatly reducing vibration and noise.

Meanwhile, in an embodiment of the present disclosure, the motor control device has a charge intention mode or a discharge intention mode based on a state of charge (SOC) of the battery.

The charge intention mode or the discharge intention mode means a mode of variably controlling the charge amount or the discharge amount of the battery based on the SOC of the battery. That is, in the zone in which the SOC of the battery is high, the use of electrical power is increased or the charge amount of the battery due to energy regeneration is reduced to perform discharge intention control. In the zone in which the SOC of the battery is low, the use of electrical power is reduced or the charge amount of the battery due to energy regeneration is increased to perform charge intention control.

Figure 6A:
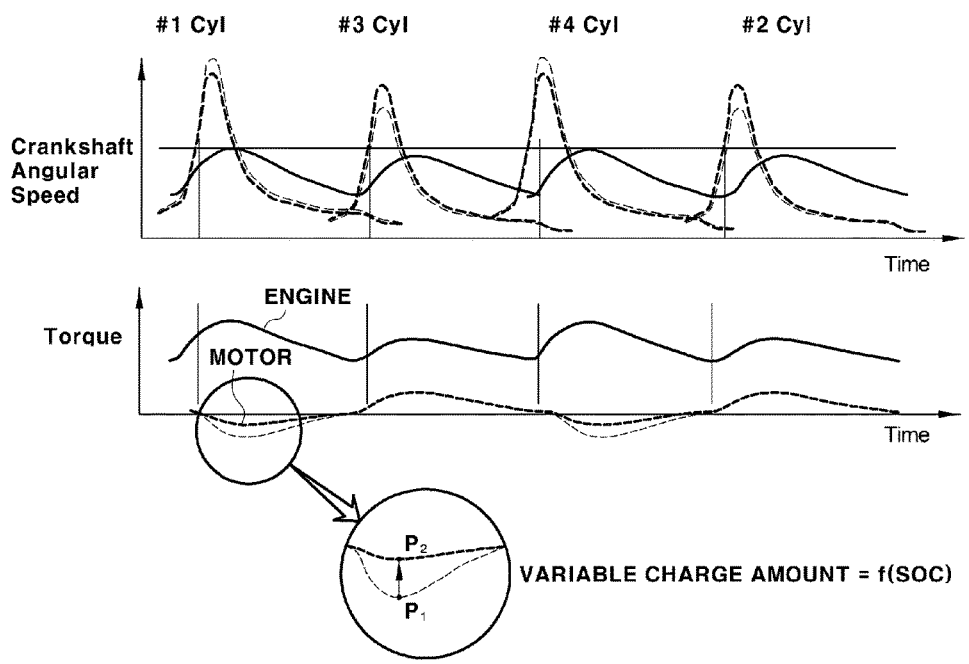
FIG. 6A is a view showing a discharge intention mode of a non-uniform displacement engine control system according to an embodiment of the present disclosure.
Figure 6B:
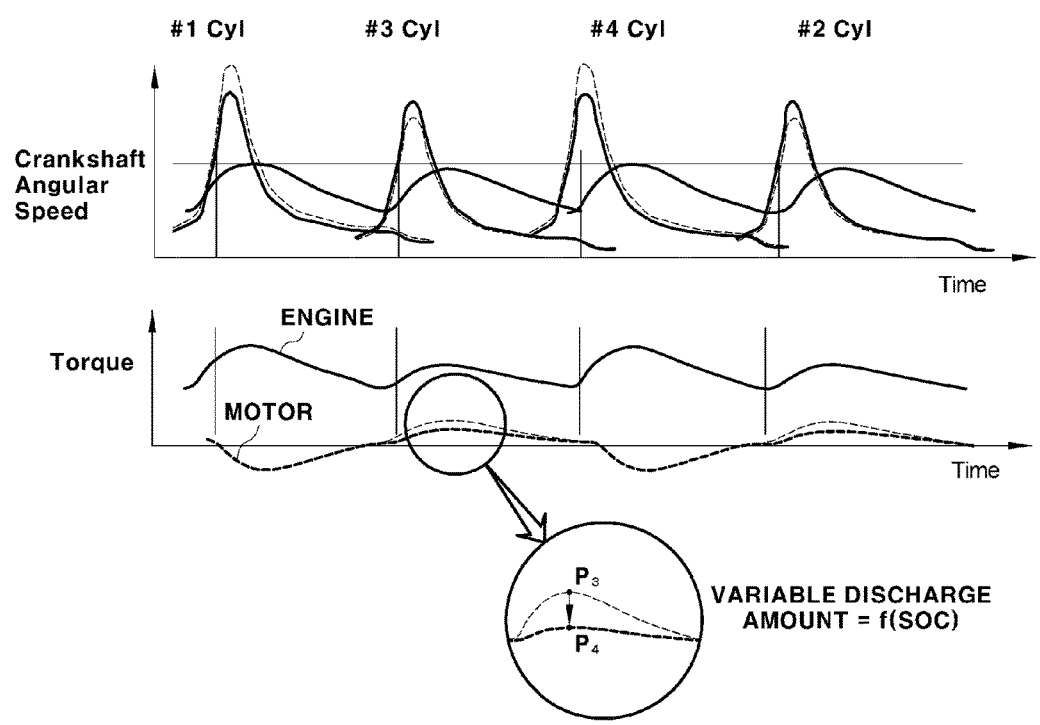
FIG. 6B is a view showing a charge intention mode of the non-uniform displacement engine control system according to an embodiment of the present disclosure.

Examples of the charge intention mode and the discharge intention mode are shown in FIGS. 6A and 6B.

In FIGS. 6A and 6B, control is performed based on control mode ②. FIG. 6A is a view showing a discharge intention mode during motor control based on control mode ②, and FIG. 6B is a view showing a charge intention mode during motor control based on control mode ②, based on embodiments of the present disclosure.

Referring to an example of FIG. 6A, in the discharge intention mode, the amount of energy regeneration is reduced in the stroke in which charging of the battery based on energy regeneration is performed, i.e. the explosion stroke of each of the high displacement cylinders. In the discharge intention mode, therefore, the charge amount due to energy regeneration is reduced, whereby it is possible to perform control such that the SOC of the battery is reduced.

On the other hand, in the charge intention mode, the discharge amount by the driving of the motor is reduced in the stroke in which the battery is discharged due to driving of the motor, i.e. the explosion stroke of each of the low displacement cylinders. In the charge intention mode, therefore, the discharge amount by the driving of the motor is reduced based on the SOC of the battery, whereby it is possible to perform control such that the SOC of the battery is increased. For example, the charge amount may be reduced ($P_1 \rightarrow P_2$), as shown in FIG. 6A, or the discharge amount may be reduced ($P_3 \rightarrow P_4$), as shown in FIG. 6B.

In variable control of the charge amount and the discharge amount, the addition and subtraction ratio of the charge amount or the discharge amount may be set based on a charge intention or a discharge intention control and design values. The addition and subtraction ratio may be set based on the SOC of the battery. As shown in FIGS. 6A and 6B, the variable charge amount or the variable discharge amount may be set as the function of the SOC of the battery in order to set the addition and subtraction ratio of the charge amount or the discharge amount.

Unlike FIGS. 6A and 6B, control may be considered such that the discharge amount is increased in the discharge intention mode and the charge amount is increased in the charge intention mode. However, as shown in FIGS. 6A and 6B, control is performed such that the charge amount or the discharge amount is reduced in consideration of motor load and safe control.

The reduction of the charge amount or the discharge amount may be achieved by applying a compensation coefficient to compensate for the motor torque value based on a value of torque output from the motor. For example, a compensation coefficient ($\alpha<1$) of the charge intention mode to reduce motor driving torque may be applied in the charge intention mode, and a compensation coefficient ($\beta<1$) of the discharge intention mode for regenerative torque may be applied in the discharge intention mode. The compensation coefficients may be fixed constant values or values preset so as to vary based on the SOC of the battery. In addition, the compensation coefficient $\alpha$ and the compensation coefficient $\beta$ may be the same value or different values.

The charge intention mode or the discharge intention mode may be applied in control mode ② since both the motor driving stroke and the energy regeneration stroke are included. Of course, the charge intention mode or the discharge intention mode may be applied in control modes ①, ③, and ④. In this case, however, the distinction between the respective control modes may not be clear, resulting in complex control. For example, in a case in which the charge intention mode or the discharge intention mode is applied to change the charge amount or the discharge amount in control mode ①, control is substantially performed in the same manner as in control mode ③ or control mode ④. In a case in which the charge intention mode or the discharge intention mode is applied in control mode ③ or control mode ④, the distinction between control mode ③ and control mode ② or between control mode ④ and control mode ② may be unclear. As in this embodiment, therefore, the charge intention mode or the discharge intention mode is applied only in control mode ②.

Meanwhile, the charge intention mode or the discharge intention mode may be applied as sub control modes for control modes ① to ④. Consequently, the charge intention mode or the discharge intention mode is temporarily applied until the SOC of the battery reaches a predetermined reference value. For example, in a case in which the reference value of the SOC of the battery is set to 50%, the charge intention mode or the discharge intention mode is terminated only when the SOC of the battery reaches the reference value, i.e. 50%, after control is performed according to the charge intention mode or the discharge intention mode, and then the procedure may return to the basic control modes, i.e. control modes ① to ④. In a case in which the charge intention mode or the discharge intention mode is applied only in control mode ②, therefore, the procedure returns to control mode ② when the SOC of the battery reaches the reference value. When the charge intention mode or the discharge intention mode is terminated, therefore, the motor is controlled such that the sum of the engine torque and the motor torque is uniform.

Figure 7:
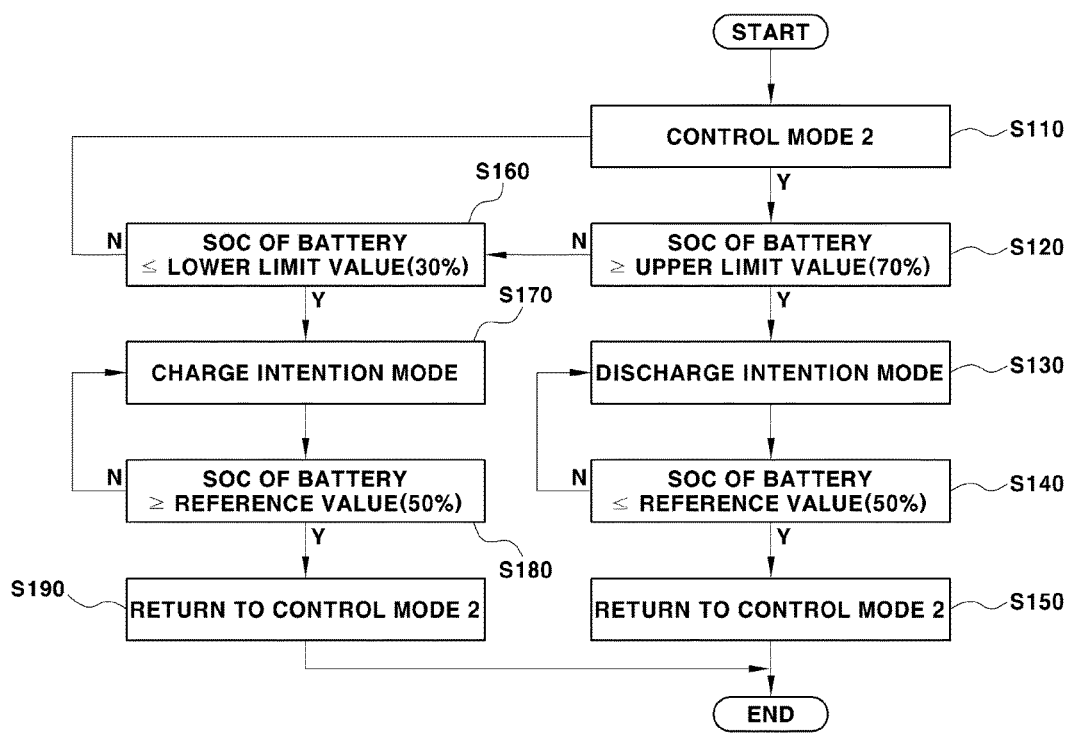
FIG. 7 is a flowchart showing a control method of the non-uniform displacement engine control system according to embodiments of the present disclosure.

The control sequence is shown in FIG. 7.

FIG. 7 shows an example in which the discharge intention mode or the charge intention mode is applied only in control mode ②. As shown in FIG. 7, when the SOC of the battery is equal to or greater than a predetermined upper limit value (for example, when the SOC of the battery is 70%) (S120) during driving in control mode ② (S110), entry into the discharge intention mode is performed (S130). When the SOC of the battery reaches a predetermined reference value (for example, 50%) (S140) after the motor is controlled such that the battery is consumed according to the discharge intention mode, the discharge intention mode is terminated, and the procedure returns to control mode ② (S150).

When the SOC of the battery is less than the predetermined upper limit value at step S120, it is determined whether the SOC of the battery is equal to or less than a predetermined lower limit value (for example, 30%) (S160). When the SOC of the battery is equal to or less than the lower limit value, entry into the charge intention mode is performed (S170). When the SOC of the battery reaches the reference value (50%) (S180) after the motor is controlled such that the battery is charged according to the charge intention mode, the procedure returns to control mode ② (S190).

According to the control method of the non-uniform displacement engine control system including the charge intention mode or the discharge intention mode, it is possible to sufficiently mitigate vibration and noise generated by the non-uniform displacement engine and to efficiently manage the SOC of the battery.

As is apparent from the above description, an embodiment of the present disclosure may be used as a variable displacement engine and a control system in a vehicle using an engine and a motor as a power source, as in a hybrid vehicle.

In addition, in an embodiment of the present disclosure, modes based on traveling conditions may be selectively embodied. Consequently, it is possible to variously perform control in operation zones, such as the exhibition of power performance or the optimization of fuel efficiency, as described.

In addition, in an embodiment of the present disclosure, it is possible to increase freedom in the control of the hybrid vehicle, thereby proposing a new paradigm to control the driving of the hybrid vehicle.

In particular, according to the present disclosure, it is possible to configure a driving system such that variable displacement control is elaborately performed through the use of the motor within a set variable range.

In addition, it is possible to solve vibration and noise problems caused by the non-uniform displacement engine, thereby improving travelling performance.

In addition, in an embodiment of the present disclosure, it is possible to selectively use the charge intention mode or the discharge intention mode based on the state of charge of the battery, whereby it is possible to maintain the state of charge of the battery to be uniform by variably controlling the addition and subtraction ratio of the charge amount or the discharge amount based on the current state of the battery. Consequently, it is possible to improve the performance and durability of the battery.

The disclosure has been described in detail with reference to embodiments thereof. However, it will be appreciated by those skilled in the art that changes may be made in these embodiments without departing from the principles and spirit of the disclosure, the scope of which is defined in the appended claims and their equivalents.

What is claimed is:

1. A non-uniform displacement engine control system with different control modes based on a state of charge (SOC) of a battery, the system comprising:
    a non-uniform displacement engine including a plurality of cylinders, the cylinders comprising at least two sizes of cylinders having different displacements;
    a motor connected to a driving shaft of the engine;
    a battery for supplying electrical energy to the motor; and
    a motor control device for controlling the motor, wherein
    the motor control device controls the motor to compensate for a difference in torque due to different displacements of the cylinders such that a sum of engine torque and motor torque in explosion stroke of each cylinder is uniform, and
    the motor control device has a charge intention mode or a discharge intention mode based on the SOC of the battery, and
    the motor control device having at least two control modes, the respective control modes configured to have different total driving torques by adjusting a motor assist torque and a motor regenerative torque in accordance with the engine torque such that the driving torque is varied by changing the control mode,
    wherein the motor assist torque and the motor regenerative torque are predetermined to compensate the torque difference due to different displacements of the cylinders and the control modes are stored in the motor control device,
    wherein each of the control modes has a predetermined target displacement being different from each other and the motor assist torque and the motor regenerative torque are predetermined based on the target displacement,
    wherein a variable displacement control is performed by changing the control mode.

2. The system of claim 1, wherein the motor control device performs control to reduce a discharge amount due to driving of the motor based on the SOC of the battery in the charge intention mode and to reduce a charge amount due to energy regeneration in the discharge intention mode.

3. The system of claim 1, wherein the charge intention mode or the discharge intention mode is temporarily applied until the SOC of the battery reaches a predetermined reference value.

4. The system of claim 1, wherein the motor control device applies a compensation coefficient ($\alpha<1$) for motor driving torque in the charge intention mode and a compensation coefficient ($\beta<1$) for regenerative torque in the discharge intention mode.

5. The system of claim 4, wherein the compensation coefficients are fixed values or values preset so as to vary based on the SOC of the battery.

6. The system of claim 1, wherein the motor control device controls the motor based on the discharge intention mode when the SOC of the battery is equal to or greater than a predetermined upper limit value and controls the motor based on the charge intention mode when the SOC of the battery is equal to or less than a predetermined lower limit value.

7. The system of claim 6, wherein the motor control device performs controls to terminate the discharge intention mode when the SOC of the battery reaches a predetermined reference value in the discharge intention mode and to terminate the charge intention mode when the SOC of the battery reaches the predetermined reference value in the charge intention mode, and controls the motor such that the sum of the engine torque and the motor torque is uniform when the discharge intention mode or the charge intention mode is terminated.

8. The system of claim 1, wherein the non-uniform displacement engine comprises two sets of cylinders, each set of cylinders comprising at least two cylinders having the same displacement.

9. The system of claim 1, wherein the non-uniform displacement engine is configured such that first and fourth cylinders have a higher displacement than second and third cylinders, and each set of cylinders alternately performs an explosion stroke.

10. The system of claim 1, wherein
the non-uniform displacement engine comprises two sizes of cylinders having different displacements, and
the motor control device comprises a mode for controlling the motor such that energy recuperation is achieved in explosion strokes of high displacement cylinders and controlling the motor such that power assistance is achieved by the motor torque in explosion strokes of low displacement cylinders such that the sum of the engine torque and the motor torque in the explosion stroke of each cylinder is uniform.

11. A control method of a system comprising a non-uniform displacement engine including a plurality of cylinders, the cylinders including at least two sizes of cylinders having different displacements, and a motor connected to a driving shaft of the engine, the method comprising:
driving the non-uniform displacement engine;
determining motor torque based on engine torque; and
controlling the motor based on the determined motor torque,
wherein the determining step includes compensating for a difference in torque due to the cylinders having different displacements to control the motor such that a sum of the engine torque and the motor torque in explosion strokes of each cylinder is uniform and having a charge intention mode or a discharge intention mode based on an SOC of a battery, and
wherein the motor is controlled by a motor control device which has at least two control modes, and the motor torque is determined by the control modes; and
the respective control modes are configured to have different total driving torques by adjusting a motor assist torque and a motor regenerative torque in accordance with the engine torque such that the driving torque is varied by changing the control mode,
wherein the motor assist torque and the motor regenerative torque are predetermined to compensate the torque difference due to different displacements of the cylinders and the control modes are stored in the motor control device,
wherein each of the control modes has a predetermined target displacement being different from each other and the motor assist torque and the motor regenerative torque are predetermined based on the target displacement,
wherein a variable displacement control is performed by changing the control mode.

12. The method of claim 11, wherein control is performed to reduce a discharge amount due to driving of the motor based on the SOC of the battery in the charge intention mode and to reduce a charge amount due to energy regeneration in the discharge intention mode.

13. The method of claim 11, wherein the charge intention mode or the discharge intention mode is temporarily applied until the SOC of the battery reaches a predetermined reference value.

14. The method of claim 11, wherein a compensation coefficient ($\alpha<1$) for motor driving torque is applied in the charge intention mode, and a compensation coefficient ($\beta<1$) for regenerative torque is applied in the discharge intention mode.

15. The method of claim 14, wherein the compensation coefficients are fixed values or values preset so as to vary based on the SOC of the battery.

16. The method of claim 11, wherein the determining step includes controlling the motor based on the discharge intention mode when the SOC of the battery is equal to or greater than a predetermined upper limit value and controlling the motor based on the charge intention mode when the SOC of the battery is equal to or less than a predetermined lower limit value.

17. The method of claim 16, wherein control is performed to terminate the discharge intention mode when the SOC of the battery reaches a predetermined reference value in the discharge intention mode and to terminate the charge intention mode when the SOC of the battery reaches the predetermined reference value in the charge intention mode, and the motor is controlled such that the sum of the engine torque and the motor torque is uniform when the discharge intention mode or the charge intention mode is terminated.

18. The method of claim 11, wherein
the non-uniform displacement engine comprises two sizes of cylinders having different displacements, and
the determining step comprises a mode for controlling the motor such that energy regeneration is achieved in explosion strokes of high displacement cylinders and controlling the motor such that power assistance is achieved by the motor torque in explosion strokes of low displacement cylinders such that the sum of the engine torque and the motor torque in the explosion stroke of each cylinder is uniform.

* * * * *